(12) United States Patent
Shenouda (10) Patent No.: US 11,614,456 B2
(45) Date of Patent: Mar. 28, 2023

(54) SYSTEM AND METHOD FOR ENGINE SPEED MEASUREMENT

(71) Applicant: PRATT & WHITNEY CANADA CORP., Longueuil (CA)

(72) Inventor: Antwan Shenouda, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 703 days.

(21) Appl. No.: 16/683,184

(22) Filed: Nov. 13, 2019

(65) Prior Publication Data

US 2020/0200787 A1 Jun. 25, 2020

Related U.S. Application Data

(60) Provisional application No. 62/783,934, filed on Dec. 21, 2018.

(51) Int. Cl.
| | |
|---|---|
| *G01P 3/28* | (2006.01) |
| *G01M 15/09* | (2006.01) |
| *G01P 3/44* | (2006.01) |
| *G01P 1/00* | (2006.01) |
| *G01P 3/22* | (2006.01) |

(52) U.S. Cl.
CPC .............. *G01P 3/28* (2013.01); *G01M 15/09* (2013.01); *G01P 1/00* (2013.01); *G01P 3/22* (2013.01); *G01P 3/44* (2013.01); *G01P 3/443* (2013.01); *F04C 2240/54* (2013.01); *F05B 2210/302* (2013.01); *F05B 2270/327* (2013.01)

(58) Field of Classification Search
CPC ................................. G01M 15/09; G01P 3/28
See application file for complete search history.

(56) References Cited

U.S. PATENT DOCUMENTS

| | | | |
|---|---|---|---|
| 5,234,315 A | 8/1993 | Ogihara et al. | |
| 6,014,996 A * | 1/2000 | Egging | A01G 23/067 60/449 |
| 7,532,969 B2 | 5/2009 | Bruno et al. | |
| 9,151,229 B2 | 10/2015 | Seistad | |
| 2011/0040502 A1 * | 2/2011 | Furmanski | A61M 1/3661 604/4.01 |

FOREIGN PATENT DOCUMENTS

EP  1600614  11/2005

* cited by examiner

*Primary Examiner* — Paul M. West
(74) *Attorney, Agent, or Firm* — Norton Rose Fulbright Canada LLP (57) ABSTRACT

A system and method for measuring a speed of an engine are provided. The engine has a positive displacement pump drivingly connected to a rotor shaft thereof, the pump having an inlet for receiving a fluid supply and an outlet for outputting pressurized fluid. A sensor signal is received from a pressure sensing device provided at an inlet of the pump, the sensor signal comprising a series of periodic oscillations. A frequency of the oscillations is determined, the frequency proportional to a rotational speed of the rotor shaft. The speed of the engine is then determined from the frequency of the oscillations and the speed of the engine as determined is output for controlling operation of the engine.

16 Claims, 6 Drawing Sheets

SYSTEM AND METHOD FOR ENGINE SPEED MEASUREMENT

CROSS REFERENCE TO RELATED APPLICATIONS

This patent application claims priority of U.S. provisional Application Ser. No. 62/783,934, filed on Dec. 21, 2018, the entire contents of which are hereby incorporated by reference.

TECHNICAL FIELD

The present disclosure relates generally to engine speed measurement.

BACKGROUND OF THE ART

Engine speed is typically measured via dedicated speed sensors. However, existing speed measurement systems may inaccurately determine engine speed under certain circumstances. In particular, at low engine speeds, the sensor signal is typically of small magnitude and may therefore be ignored by the engine controller. In addition, provision of additional speed sensors for redundancy can increase the overall system complexity and implementation cost.

Therefore, improvements are needed.

SUMMARY

In accordance with a broad aspect, there is provided a system for measuring a speed of an engine, the system comprising a positive displacement pump drivingly connected to a rotor shaft of the engine, the pump having an inlet for receiving a fluid supply and an outlet for outputting pressurized fluid, a pressure sensing device provided at an inlet of the pump, at least one processing unit, and at least one non-transitory computer-readable memory having stored thereon program instructions executable by the at least one processing unit for receiving, from the pressure sensing device, a sensor signal comprising a series of periodic oscillations, determining a frequency of the oscillations, the frequency proportional to a rotational speed of the rotor shaft, determining the speed of the engine from the frequency of the oscillations as determined, and outputting the speed of the engine as determined for controlling operation of the engine.

In accordance with another broad aspect, there is provided a computer-implemented method for measuring a speed of an engine, the engine having a positive displacement pump drivingly connected to a rotor shaft thereof, the pump having an inlet for receiving a fluid supply and an outlet for outputting pressurized fluid. The method comprises receiving, at a computing device, a sensor signal from a pressure sensing device provided at an inlet of the pump, the sensor signal comprising a series of periodic oscillations, determining, at the computing device, a frequency of the oscillations, the frequency proportional to a rotational speed of the rotor shaft, determining, at the computing device, the speed of the engine from the frequency of the oscillations as determined, and outputting, at the computing device, the speed of the engine as determined for controlling operation of the engine.

In accordance with yet another broad aspect, there is provided a non-transitory computer readable medium having stored thereon program code executable by at least one processor for receiving a sensor signal from a pressure sensing device provided at an inlet of a positive displacement pump drivingly connected to a rotor shaft of an engine, the sensor signal comprising a series of periodic oscillations, determining a frequency of the oscillations, the frequency proportional to a rotational speed of the rotor shaft, determining the speed of the engine from the frequency of the oscillations as determined, and outputting a speed of the engine as determined for controlling operation of the engine.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
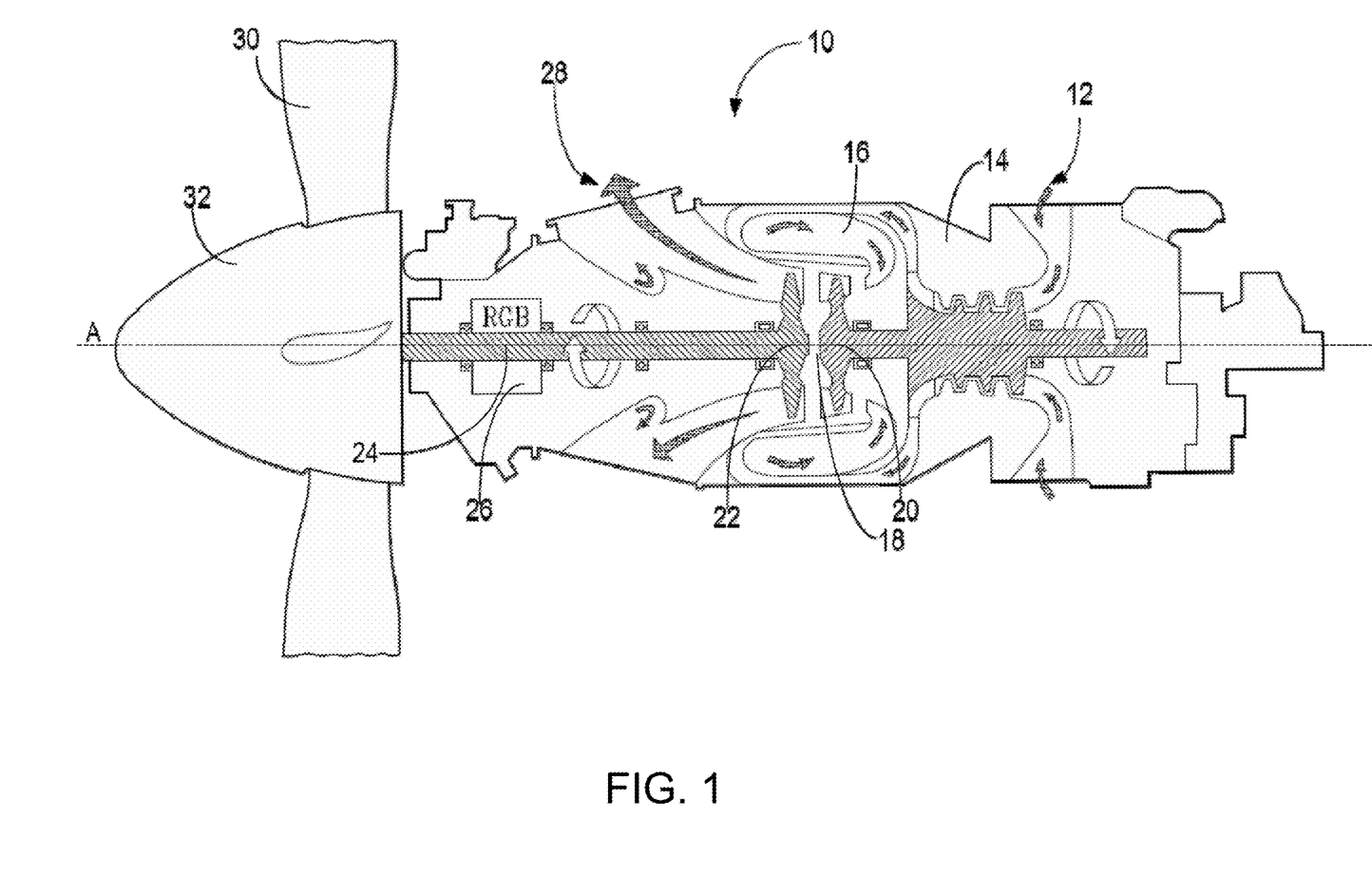
FIG. 1 is a schematic cross-sectional view of a gas turbine engine, in accordance with an illustrative embodiment.

FIG. 1 depicts a gas turbine engine 10 of a type typically provided for use in subsonic flight. The engine 10 comprises an inlet 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The turbine section 18 comprises a compressor turbine 20, which drives the compressor assembly and accessories, and at least one power or free turbine 22, which is independent from the compressor turbine 20 and rotatingly drives a rotor shaft (also referred to herein as a propeller shaft or an output shaft) 24 about a propeller shaft axis 'A' through a reduction gearbox (RGB) 26. Hot gases may then be evacuated through exhaust stubs 28. The gas generator of the engine 10 comprises the compressor section 14, the combustor 16, and the turbine section 18.

A rotor, in the form of a propeller 30 through which ambient air is propelled, is hosted in a propeller hub 32. The rotor may, for example, comprise the propeller 30 of a fixed-wing aircraft, or a main (or tail) rotor of a rotary-wing aircraft such as a helicopter. The propeller 30 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Although illustrated as a turboprop engine, the gas turbine engine 10 may alternatively be another type of engine, for example a turbofan engine, generally comprising in serial flow communication a compressor section, a combustor, and a turbine section, and a fan through which ambient air is propelled. A turboshaft engine may also apply. In addition, although the engine 10 is described herein for flight applications, it should be understood that other uses, such as industrial or the like, may apply. In particular, the systems and methods described herein are applicable to any engine where a positive displacement pump is mechanically driven by the engine in such a way that the speed of the pump is proportional to the speed of the engine.

Figure 2:
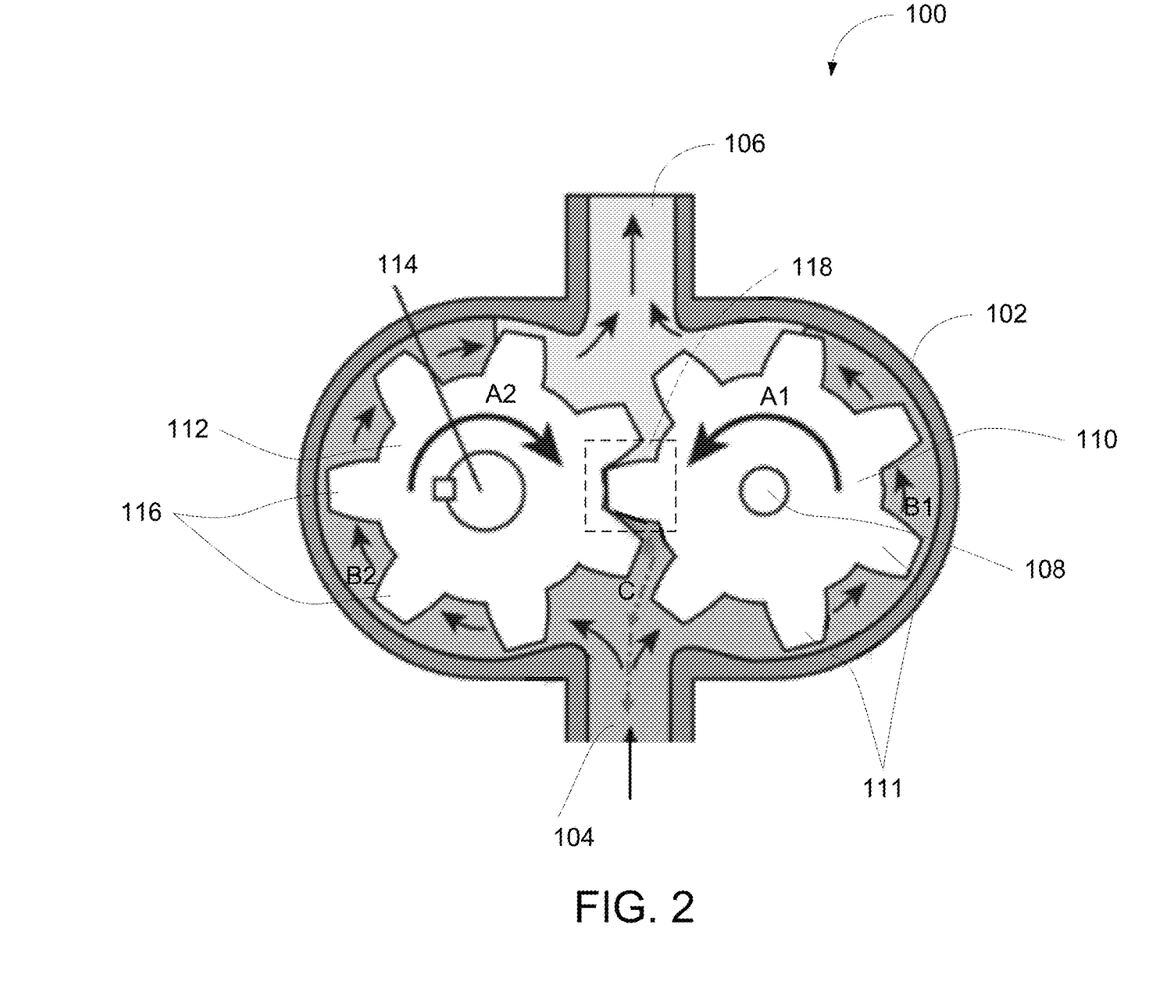
FIG. 2 is a schematic cross-sectional view of a gear pump, in accordance with an illustrative embodiment.

Referring now to FIG. 2 in addition to FIG. 1 and as will be discussed further herein, the rotational speed of the rotor shaft 24 may be derived from the frequency of pressure ripples (also referred to herein as pressure oscillations or pulses) generated by a positive displacement pump, which is drivingly connected to (and therefore mechanically driven by) the rotor shaft 24. The positive displacement pump may be a gear pump (reference 100 in FIG. 2) used for pumping fluids, such as oil and fuel, and supplying the fluids to parts of the engine 10 that require lubrication. The positive displacement pump may therefore be an oil pump, a hydraulic pump, or a fuel pump of the engine 10.

The gear pump 100 has a casing 102 accommodating therein a gear assembly, the casing 102 having a fluid inlet 104 and a fluid outlet 106. The gear pump 100 also has an input shaft 108 that is mechanically connected to the rotor shaft 24. The gear assembly comprises a first toothed gear 110 (also referred to herein as a drive gear), which is directly coupled to (e.g., mounted on) the input shaft 108. The first gear 110 has a number (N1) of outward projecting, radially disposed teeth 111, with a clearance provided between the teeth 111 of the first gear 110 and a first interior arcuate wall (not shown) of the casing 102. The first gear 110 is configured to be actuated with a rotational input from the rotor shaft 24 (via the input shaft 108) and accordingly rotates about a longitudinal axis (not shown) of the input shaft 108, in a direction of rotation A1.

The gear assembly also comprises a second toothed gear 112 (also referred to herein as a driven gear), which is directly coupled to an output shaft 114 and is also positioned within the casing 102. The second gear 112 has a number (N2) of outward projecting, radially disposed teeth 116. A clearance is provided between the teeth 116 of the second gear 112 and a second interior arcuate wall (not shown) of the casing 102, the second wall opposed to the first wall. The second gear 112 is configured to be rotated along a direction of rotation A2, about a longitudinal axis (not shown) of the output shaft 114. The second gear 112 is intermeshed with the first gear 110 in a gear meshing area 118 between the gears 110, 112. In this manner, rotational actuation of the input shaft 108 is transmitted to the second gear 112 through the first gear 110. The second gear 112 is therefore driven by the input shaft 108, with the direction of rotation A1 being opposite to the direction of rotation A2 so that opposed convection paths B1 and B2 are defined. In one embodiment (shown in FIG. 2), the gears 110, 112 have the same number (N) of teeth 116 (i.e. N1=N2=N) and therefore both gears 110, 112 rotate at the same speed. In the example shown in FIG. 2, each gear 110, 112 has seven (7) teeth 111, 116. It should however be understood that any other suitable number of teeth may apply.

As shown in FIG. 2, low pressure fluid is received at the inlet 104 of the gear pump 100. As illustrated by path B1, as the gears 110 and 112 rotate, a first portion of the fluid is pressurized by passing between the first gear 110 and an interior wall of the casing 102, to reach the outlet 106. As illustrated by path B2, as the gears 110 and 112 rotate, a second portion of the fluid is pressurized by passing between the second gear 112 and the interior wall of the casing 102, to reach the outlet 106. The pressure of the fluid at the outlet 106 is therefore a mix of the pressures of the fluids coming from paths B1 and B2, such that a high pressure fluid exits at the outlet 106. A high pressure region is therefore defined in the cavity 102, between the outlet 106 and the gear meshing area 118 while a low pressure region is defined between the inlet 104 and the gear meshing area 118 and in the area between the gears 110, 112 and the interior walls of the casing 102.

As illustrated by path C, as the gears 110 and 112 rotate, some high pressure fluid (e.g., from the high pressure region) may be trapped in the gear meshing area 118, in a volume or space between a given tooth 111 of the first gear 110 and a given tooth 116 of the second gear 112. As the gears 110, 112 rotate, this high pressure fluid may then leak to the low pressure region and be released at the inlet 104. For each complete revolution of the gears 110, 112, this in turn generates, at regular time intervals, high pressure ripples whose number is proportional to the number of gear teeth 111, 116. In one embodiment, the number of high pressure ripples is substantially equal to the number of gear teeth 111, 116. For instance, continuing with the example illustrated in FIG. 2, for one full revolution of the gears 110 and 112, seven (7) high pressure ripples are generated at regular time intervals. The high pressure ripples can then be measured using a suitable pressure sensing device (not shown) located at the inlet 104.

Since the gear pump 100 is mechanically driven by the engine's rotor shaft 24, the speed of the gear pump 100 is directly proportional to the speed of the rotor shaft 24. In particular, one revolution of the rotor shaft 24 corresponds to a predetermined ratio depending on engine configuration. As a result, the frequency of the pressure ripples is directly proportional to the speed of the engine 10. For instance, continuing with the example of FIG. 2, seven (7) pressure ripples correspond to one complete revolution of the gears 110, 112 and accordingly to one revolution of the rotor shaft 24. It should however be understood that other embodiments (e.g. other suitable ratios), may apply. By measuring the frequency of the pressure ripples and using the known relationship between the pressure ripple frequency and the engine speed (e.g., one rotor shaft revolution corresponds to N pulse ripples), it therefore becomes possible to directly determine the rotational speed of the engine 10, as will be discussed further below.

Figure 3:
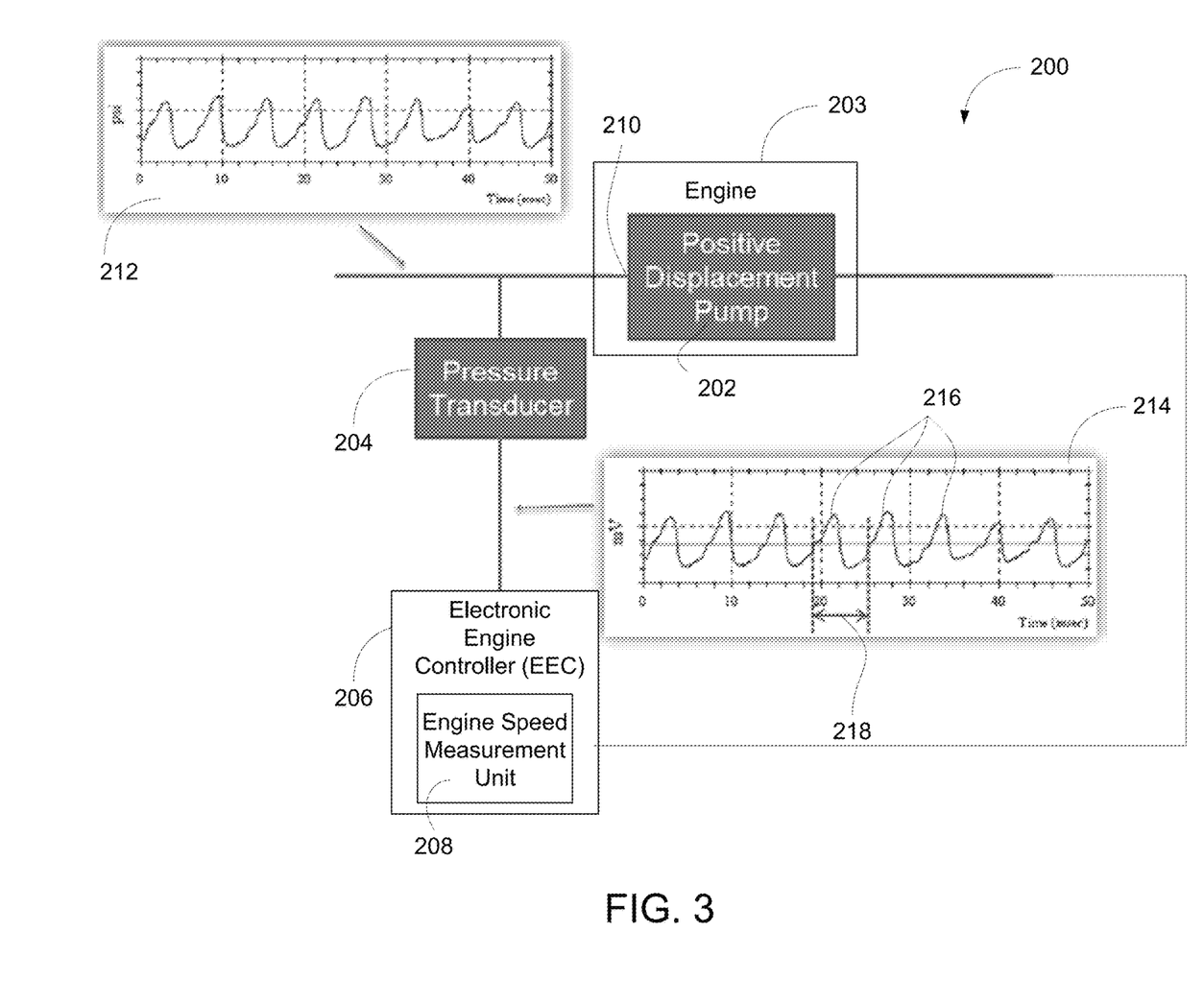
FIG. 3 is a block diagram of a system for engine speed measurement, in accordance with an illustrative embodiment.

FIG. 3 illustrates an engine speed measurement system 200. The system 200 comprises a positive displacement pump 202 (such as the gear pump 100 illustrated in FIG. 2), which is part of an engine 203 (such as the engine 10 illustrated in FIG. 1), a pressure transducer 204, and an Electronic Engine Controller (EEC) 206 comprising an engine speed measurement unit 208. The EEC 206 may be part of a Full Authority Digital Engine Control (FADEC), which is used to control the operation and performance of the engine 203.

The pressure transducer 204 is positioned at an inlet 210 of the pump 202 and is electrically connected to the EEC 206. The pressure transducer 204 is configured to measure the high pressure ripples (illustrated by plot 212) generated at the inlet 210 of the pump 202. In one embodiment, the pressure transducer 204 is configured for absolute pressure measurement. The pressure transducer 204 then outputs a pressure ripple signal (illustrated by plot 214) that is received at the EEC 206. The pressure ripple signal 214 comprises a series of periodic pulses (or oscillations) 216, each oscillation being representative of a release (or leakage) of high pressure fluid at the inlet 210 of the pump 202.

Figure 4A:
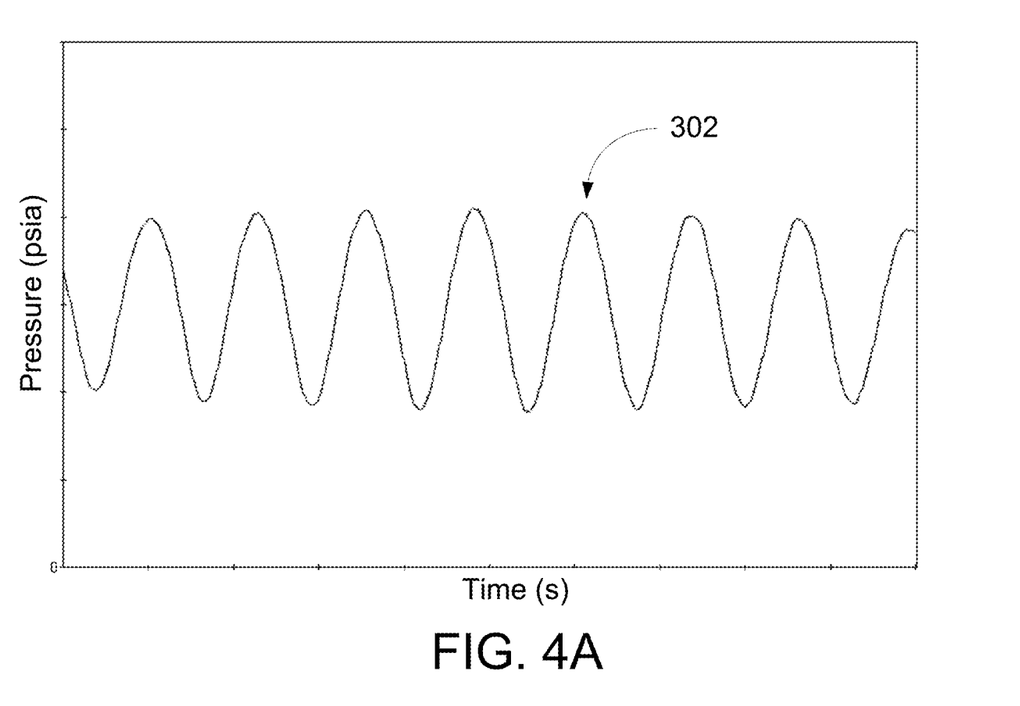
FIG. 4A illustrates a plot of a noiseless pressure ripple signal and FIG. 4B illustrates a plot of a noisy pressure ripple signal, in accordance with an illustrative embodiment.
Figure 4B:
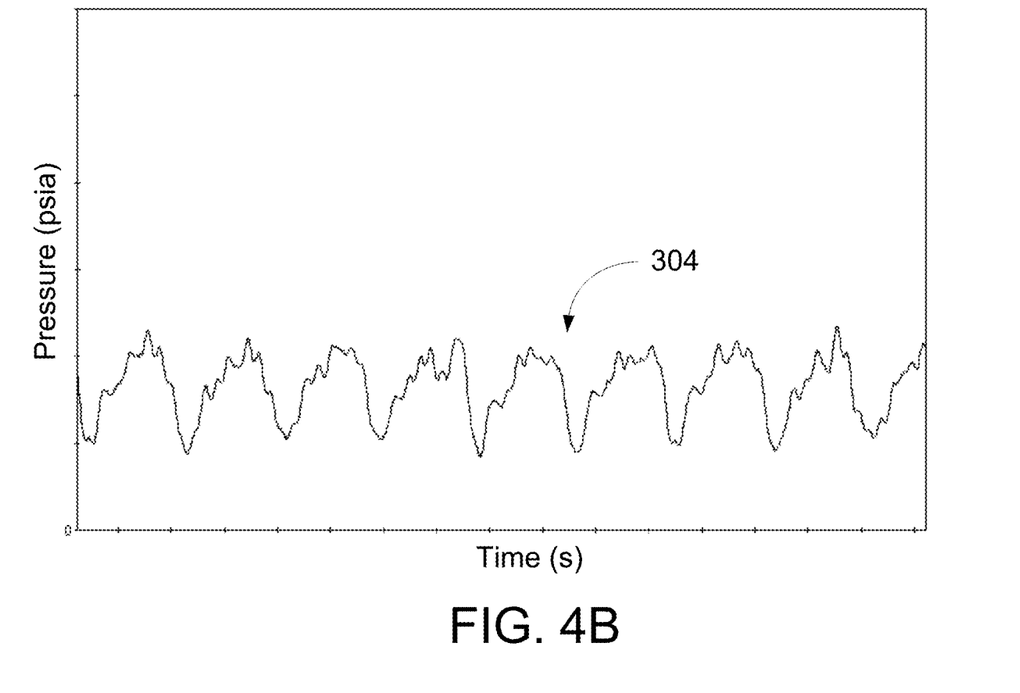

It should be understood that the pressure ripple signal received at the EEC 206 may contain or be absent of noise. FIG. 4A illustrates a plot 302 of a noiseless pressure ripple signal while FIG. 4B illustrates a plot 304 of a noisy pressure ripple signal. The EEC 206 may indeed be configured to sample the pressure ripple signal 214 at predetermined time intervals and the sampled signal (see plot 304) may comprise high frequencies (i.e. noise) not representative of engine speed. The EEC 206 may therefore comprise a filtering unit (not shown) used to remove the undesirable frequencies (see plot 302). The filtering may be optionally performed, depending on whether a noisy signal exists throughout the range of desired speed measurement. Any suitable filtering technique may be used and the filtering technique implemented by the filtering unit may be active or passive. It should indeed be understood that the filtering may be performed using software, hardware, or a combination of both. Passive hardware filters may consist of a capacitor and resistor arrangement. A hardware filter may be implemented in the pressure transducer 204. Active hardware filters may consist of a resistor, capacitor, and amplifier arrangement. Hardware and software filers may be implemented in the EEC 206, as discussed above.

Referring back to FIG. 3, the engine speed measurement unit 208 receives the optionally filtered pressure ripple signal 214 and determines the pressure ripple frequency (i.e. the number of occurrences of the high pressure pulses per unit of time) using any suitable technique. For example, the engine speed measurement unit 208 may first measure the period 218 of the pressure ripple signal 214 using any suitable technique, such as measuring the time elapsed between two consecutive zero crossings of the pressure ripple signal 214. The engine speed measurement unit 208 may then determine the reciprocal of the period 218, i.e. the pressure ripple frequency. The engine speed may then be derived based on the known relationship between the pressure ripple frequency and the engine speed. Once the engine speed has been determined, the EEC 206 may control operation of the engine 203 accordingly. For instance, the EEC 206 may be configured to compare the engine speed to a predetermined threshold and to control one or more operating parameters of the engine 203 to bring the engine speed within the threshold. The EEC 206 may also be configured to trigger an alert in response to determining that the engine speed is beyond the threshold. Other embodiments may apply.

Figure 5:
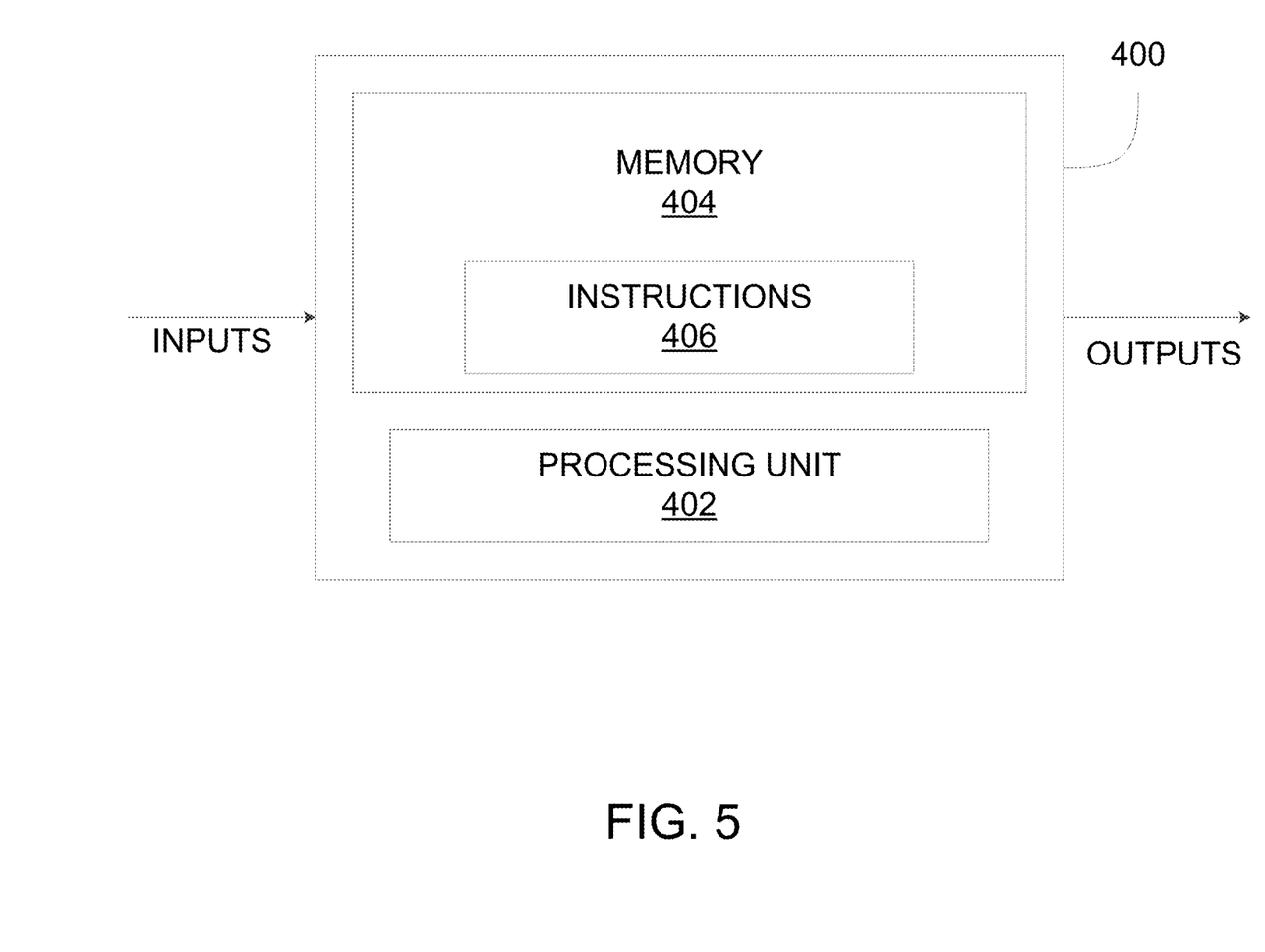
FIG. 5 is a block diagram of a computing device for implementing the system of FIG. 3, in accordance with an illustrative embodiment.

FIG. 5 is an example embodiment of a computing device 400 for implementing the EEC 206 (and more particularly the engine speed measurement unit 208) described above with reference to FIG. 3. The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

Figure 6:
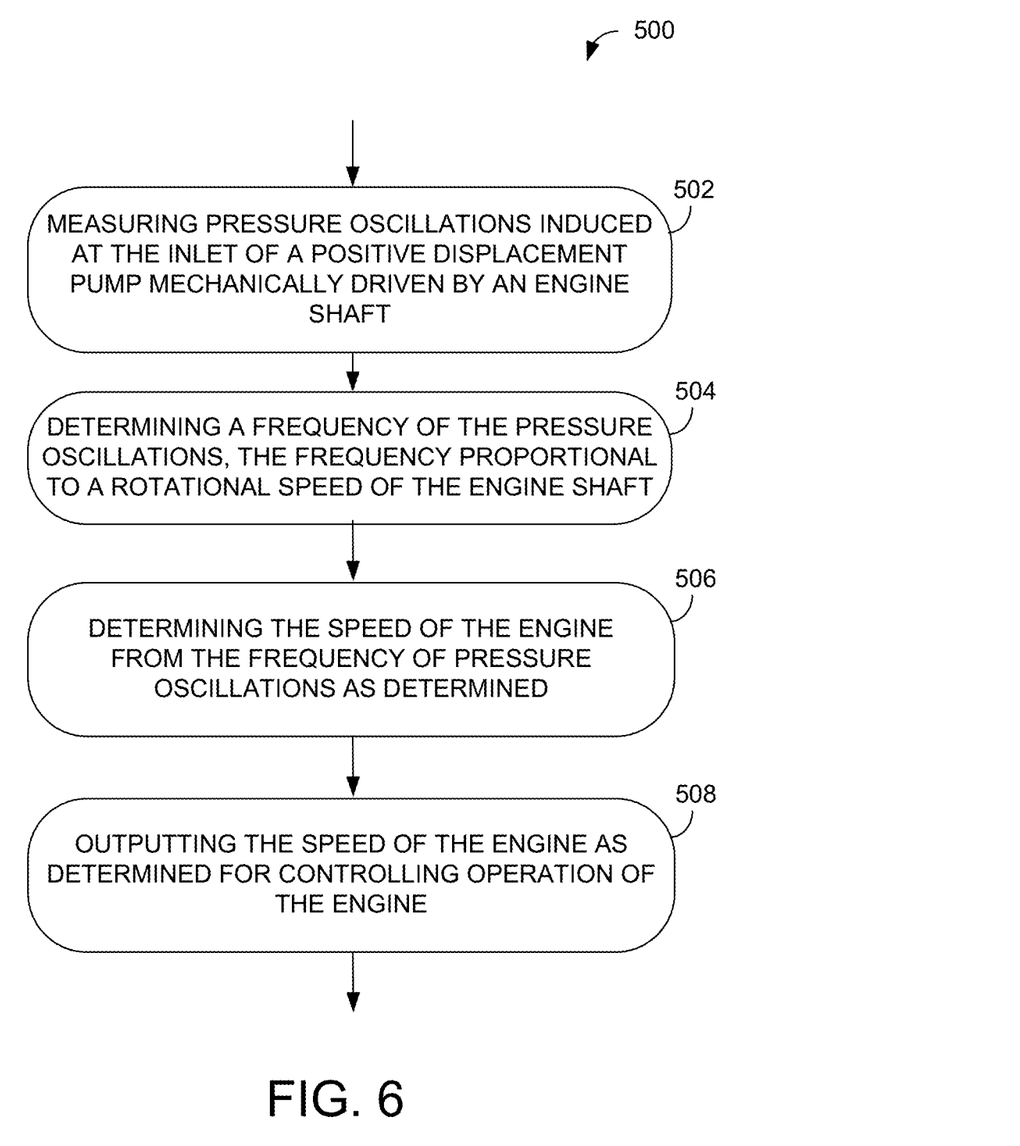
FIG. 6 is a flowchart of a method for engine speed measurement, in accordance with an illustrative embodiment.

Referring now to FIG. 6, an example method 500 for engine speed measurement will now be described. The method 500 may be implemented by the speed measurement unit 208 provided in the EEC 206 of FIG. 3, i.e. by the computing device 400 of FIG. 5. The method 500 comprises, at step 502, measuring pressure oscillations (also referred to herein as pressure ripples or pulses) induced at the inlet of a positive displacement pump (e.g., the gear pump 100 of FIG. 2) mechanically driven by an engine shaft (e.g. the rotor shaft 24 of FIG. 1). The pressure oscillations may be measured using any suitable pressure sensing device, such as a pressure transducer positioned at an inlet of the positive displacement pump. The frequency of the pressure oscillations (also referred to herein as the pressure ripple frequency) is then determined at step 504, with the frequency being proportional to a rotational speed of the engine shaft. The engine speed is then determined at step 506 from the frequency of the pressure oscillations as determined at step 506. In particular and as discussed herein above, the engine speed is determined from the known relationship between the frequency of the pressure oscillations and the engine speed (e.g., one rotor shaft revolution corresponds to N pressure oscillations, with N being the number of teeth of the gear pump). The engine speed as determined is then output at step 508 and operation of the engine may then be controlled accordingly.

The systems and methods described herein illustratively make use of pressure transducers, which are typically readily provided in the engine (reference 10 in FIG. 1 or reference 203 in FIG. 3) for measuring oil and fuel pressures, to also measure engine speed. As such, the systems and methods described herein may, in one embodiment, allow engine speed measurement to be performed without additional weight to the overall engine system.

In one embodiment, the systems and methods described herein may use the pressure ripple signal as a primary method of measuring engine speed when the engine 10, 203 is operating at low speeds (e.g., during engine starting or engine shutdown). In this case, it may be desirable for the engine system (e.g. fuel or oil system) associated with the speed measurement to be designed so as to ensure that pressure ripples can be measured across all speed, temperature, and pressure ranges. It may also be desirable for the engine system to be designed so as to reduce or eliminate reflections of the pressure ripples and avoid measuring bounce-backs in the pressure ripples. The systems and methods described herein may be particularly applicable for systems where high pump ripple cannot be easily eliminated. Indeed, it may be desirable to reduce or eliminate pump ripples, which induce stresses on engine components.

For this purpose, the pressure transducer (reference 204 in FIG. 3) may be placed at a location where maximum ripple occurs (e.g., directly at the inlet of the gear pump (reference 100 in FIG. 2).

In other embodiments, the systems and methods described herein may use the pressure ripple signal as a secondary method of measuring engine speed. For example, the pressure ripple signal may be used in case of a failure of a primary engine system, as a means to validate a synthesized speed signal, or for refereeing between mismatched primary speed measurements.

The systems and methods described herein may be implemented in a speed measurement device comprising a miniature fluid pump mechanically connected to the shaft of a machine requiring shaft speed measurement, a fluid circuit in closed loop with the miniature pump, and a pressure transducer located at the inlet of the pump. The pressure transducer would be configured to measure the pressure ripples induced at the pump's inlet and to output a measurement proportional to the speed of the machine's shaft.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A system for measuring a speed of a gas turbine engine, the system comprising:
   a positive displacement pump drivingly connected to a rotor shaft of the gas turbine engine, the pump having an inlet for receiving a fluid supply and an outlet for outputting pressurized fluid;
   a pressure sensing device provided at an inlet of the pump;
   at least one processing unit; and
   at least one non-transitory computer-readable memory having stored thereon program instructions executable by the at least one processing unit for:
      receiving, from the pressure sensing device, a sensor signal comprising a series of periodic oscillations,
      determining a frequency of the oscillations, the frequency proportional to a rotational speed of the rotor shaft,
      determining the speed of the gas turbine engine from the frequency of the oscillations as determined, and outputting the speed of the gas turbine engine as determined for controlling operation of the engine.

2. The system of claim 1, wherein the positive displacement pump is a gear pump comprising a first toothed gear and a second toothed gear, the first gear directly coupled to the rotor shaft and driven with a rotational input from the rotor shaft, and the second gear intermeshed with the first gear at a gear meshing area such that rotational actuation of the first gear is transmitted to the second gear, the fluid supply pressurized as the first and second gears rotate.

3. The system of claim 2, wherein the sensor signal comprising the series of periodic oscillations each indicative of leakage of a portion of the pressurized fluid at the inlet as the pump is actuated by the rotational input from the rotor shaft.

4. The system of claim 3, wherein the portion of the pressurized fluid is trapped in the gear meshing area and periodically released at the inlet as the first and second gears rotate.

5. The system of claim 4, wherein, for each complete revolution of the first and second gears, the series of periodic oscillations is generated with a number of the oscillations being proportional to a number of teeth of the first and second gears.

6. The system of claim 1, wherein the program instructions are executable by the at least one processing unit for determining the frequency of the oscillations comprising determining a time elapsed between two consecutive zero crossings of the sensor signal.

7. The system of claim 1, wherein the positive displacement pump is an oil pump of the gas turbine engine.

8. The system of claim 1, wherein the positive displacement pump is a fuel pump of the gas turbine engine.

9. The system of claim 1, wherein the positive displacement pump is a hydraulic pump of the gas turbine engine.

10. A computer-implemented method for measuring a speed of a gas turbine engine, the gas turbine engine having a positive displacement pump drivingly connected to a rotor shaft thereof, the pump having an inlet for receiving a fluid supply and an outlet for outputting pressurized fluid, the method comprising:
   receiving, at a computing device, a sensor signal from a pressure sensing device provided at an inlet of the pump, the sensor signal comprising a series of periodic oscillations;
   determining, at the computing device, a frequency of the oscillations, the frequency proportional to a rotational speed of the rotor shaft;
   determining, at the computing device, the speed of the gas turbine engine from the frequency of the oscillations as determined; and
   outputting, at the computing device, the speed of the gas turbine engine as determined for controlling operation of the engine.

11. The method of claim 10, wherein the sensor signal is received from a pressure sensing device provided at the inlet of a gear pump comprising a first toothed gear and a second toothed gear, the first gear directly coupled to the rotor shaft and driven with a rotational input from the rotor shaft, and the second gear intermeshed with the first gear at a gear meshing area such that rotational actuation of the first gear is transmitted to the second gear, the fluid supply pressurized as the first and second gears rotate.

12. The system of claim 11, wherein the sensor signal comprises a series of periodic oscillations each indicative of leakage of a portion of the pressurized fluid at the inlet as the pump is actuated by the rotational input from the rotor shaft.

13. The method of claim 12, wherein the received sensor signal comprises the series of periodic oscillations each indicative of the release of the portion of the pressurized fluid trapped in the gear meshing area and periodically released at the inlet as the first and the second gears rotate.

14. The method of claim 13, wherein, for each complete revolution of the first and second gears, the sensor signal is received as comprising a number of the oscillations proportional to a number of teeth of the first and second gears.

15. The method of claim 10, wherein determining the frequency of the oscillations comprises determining a time elapsed between two consecutive zero crossings of the sensor signal.

16. A non-transitory computer readable medium having stored thereon program code executable by at least one processor for:
- receiving a sensor signal from a pressure sensing device provided at an inlet of a positive displacement pump drivingly connected to a rotor shaft of a gas turbine engine, the sensor signal comprising a series of periodic oscillations;
- determining a frequency of the oscillations, the frequency proportional to a rotational speed of the rotor shaft;
- determining the speed of the gas turbine engine from the frequency of the oscillations as determined; and
- outputting a speed of the gas turbine engine as determined for controlling operation of the engine.

\* \* \* \* \*